United States Patent Office 3,700,618
Patented Oct. 24, 1972

3,700,618
POLYAMIDES EXHIBITING IMPROVED FREEZE-THAW CHARACTERISTICS IN PRINTING INK COMPOSITIONS
Hubert Joseph Sharkey and Robert J. Sturwold, Cincinnati, Ohio, assignors to Emery Industries, Inc., Cincinnati, Ohio
No Drawing. Filed July 31, 1969, Ser. No. 846,611
Int. Cl. C08f 45/34
U.S. Cl. 260—33.4 R                        8 Claims

ABSTRACT OF THE DISCLOSURE

Poyamide resins exhibiting improved freeze-thaw characteristics in printing ink compositions comprise the reaction product of a diamine with a selected mixture of carboxylic acids comprising from about 20 to 90 equivalent percent of a polymeric carboxylic acid having an acid functionality of at least 3; from about 10 to 80 equivalent percent of a polymeric carboxylic acid having an acid functionality of about 2; in a ratio of the former polymeric carboxylic acid to the latter polymeric carboxylic acid of from about 1:4 to 9:1; and from about 10 to 60 equivalent percent of a chain-stopping monocarboxylic acid.

BACKGROUND OF INVENTION

(1) Field of the invention

This invention relates to the field of polyamide resins and more particularly, to polyamide resins exhibiting improved freez-thaw and alcohol characteristics in printing ink compositions.

(2) prior art

Flexographic printing is the predominant method for applying ink to films such as polyethylene, polypropylene, vinylidene chloride, and cellophane, among others. The ink is applied to the substrate in the form of a solution which usually contains a resin binder, preferably a polyamide resin, pigment, and other additives which impart various properties to the ink. The flexigraphic ink solutions are commonly applied by a rubber roller which is subject to attack by such solvents as hydrocarbons, esters, or ketones. Alcohols as a general rule do not attack rubber rollers and thus have become the preferred solvents for flexographic inks. One disadvantage of present polyamides available is their unsatisfactory solubility in alcohols.

Another disadvantage of many polyamide resins available is their lack of good freeze-thaw characteristics. The term "freeze-thaw" designates the capacity of a resin solution to recover its fluidity at ambient temperatures after having been subjected to temperatures at which the resin solution gels or freezes. Although many polyamide resins exhibiting good ink binding properties have fluidity at ambient temperatures, when cooled below a certain point they form a gel which is difficult to solubilize in the absence of severe mechanical or heat treatment. Restoring these resin solutions to a fluid state by such treatments is troublesome and inconvenient, if not impractical for the final user of the resin-based ink.

In addition, as suitable ink binders the polyamide resins must also possess other desirable characteristics, such as exhibiting adhesion to substrate; flexibility; water, oil, solvent, and detergent resistance; and acceptable pigment wetting, slip, and antiblock properties.

A number of attempts have been made in the past to prepare polyamide resins having good solubility and freeze-thaw properties and yet retain the other necessary properties required for satisfactory application as ink binders. Such efforts have included the use of a variety of carboxylic acid chain stoppers to impart desirable properties but these resins have suffered from a number of disadvantages which have hampered their use.

Although polyamide resins containing polymeric polycarboxylic acids are known in the art, these resins have not contained sufficient amounts of and critical ratios of ingredients to exhibit satisfactory alcohol solubility and excellent freeze-thaw properties as the compounds of the present invention. For example, U.S. 2,695,908 discloses a polyamide containing trimer acid; however, this polyamide shows undesirable freeze-thaw properties in printing ink compositions.

Surprisingly, it has now been found that by the proper selection of the polymeric carboxylic acids utilized and the maintenance of critical ratios thereof, unique polyamide resins exhibiting excellent freeze-thaw properties can be prepared.

SUMMARY OF INVENTION

Novel polyamide resins exhibiting satisfactory alcohol solubility and excellent freeze-thaw properties can be prepared by reacting a diamine with a mixture of carboxylic acids comprising from about 20 to 90 equivalent percent of a polymeric carboxylic acid containing from about 54 to 72 carbon atoms and having an acid functionality of at least three; from about 10 to 80 equivalent percent of a polymeric carboxylic acid containing from about 22 to 44 carbon atoms and having an acid functionality of two; and from about 10 to 60 equivalent percent of a chain stopping monocarboxylic acid wherein the amount of polymeric carboxylic acid having a functionality of about 3 or more is used in a ratio of 1:4 to 9:1 compared to the polymeric carboxylic acids having a functionality of about two.

DESCRIPTION OF INVENTION

The polymeric carboxylic acids employed in the present invention may be prepared by polymerizing unsaturated carboxylic acids containing from about 11 to 22 carbon atoms and preferably from about 16 to 20 carbon atoms. Unsaturated fatty acids within this carbon atom range provide an acceptable and convenient starting material. Processes for the production of these polymeric carboxylic acids are well known in the art as described in the following U.S. Patents, inter alia, 2,482,761; 2,793,220; 2,793,-221; 2,793,219; and 2,955,121.

In general, the polymerization of unsaturated carboxylic acids is accomplished by heating the acids in the presence of bath water and active clay material. The reaction product mixture usually contains from about 30 to 75% by weight of polymeric carboxylic acids with a balance of the mixture being monocarboxylic acids and other impurities. Preferably, these materials are removed by distillation or other separation processes to produce a mixture substantially free from monocarboxylic acid. In the trade it is customary to refer to such a reaction mixture including any minor amount of monomeric acid which may be present as "dimer acid." However, this term is usually qualified by describing the content in weight percent of the polymeric tricarboxylic acids (trimer) present. This is particularly true in many industrial applications where trimer acids are unsuitable. Some reaction conditions may not produce as high a content of trifunctional and higher polymeric carboxylic acids are desired and; consequently, a portion of the difunctional carboxylic acids must be removed in order to increase the ratio of trifunctional to difunctional material. In practice this may be accomplished by molecular distillation of "dimer acid," recovering the residual polymerized acids (80–90% trimer and higher with 10–20 dimer), and blending back with additional dimer to achieve the desired trimer/dimer ratio. As the terms dimer and trimer are used herein, they refer to polymeric dicarboxylic and higher oligimeric acids respectively.

Mixtures of polymerized carboxylic acids suitable for use within the scope of the present invention should have from about 20 to 90 equivalent percent of polymeric tricarboxylic and higher functionality acids and preferably about 30 to 80 equivalent percent. The polymeric dicarboxylic acids may range from about 10 to 80 equivalent percent and preferably from 30 to 60 equivalent percent. In a preferred embodiment most of the monocarboxylic acid remaining from the polymerization reaction is removed, leaving only trace quantities. However, amounts up to as high as 5 equivalent percent may be tolerated without any adverse effect on the polyamide resins of the present invention.

During reaction of the diamines with the polymeric carboxylic acids, selected monocarboxylic acids are added to the reaction in order to chain stop or terminate the polyamide polymer. The monocarboxylic acids which remain after polymerization of the unsaturated carboxylic acids are removed, because of impurities therein and to allow property modification of the polyamide resins by selection of particular monocarboxylic acid chain stoppers.

The monocarboxylic acid chain stoppers used in preparing the polyamides of this invention may be normal aliphatic monocarboxylic acids having from 2 to 6 carbon atoms, $C_{12}$ to $C_{22}$ fatty acids, $C_4$ to $C_{20}$ branched acids, 4,4-bis(hydroxyaryl)pentanoic acids, hydroxyaryl $C_{16}$ to $C_{18}$ unsaturated fatty acids, or mixtures of these acids. The monocarboxylic acids have a significant influence upon the properties of the polyamide resins, particularly the softening point. The normal aliphatic monocarboxylic acids may be such acids as acetic, propionic, or butyric acid.

The $C_{12}$-$C_{22}$ fatty acids such as the oleic and linoleic acid mixtures present in safflower or tall oil fatty acids are preferred. The branched acids having from 4 to 20 carbon atoms may be such acids as 2-ethylhexanoic acid, isooctanoic acid, isononanoic acid, the hydrogenated reaction product of diisobutylene and acrylic acid and such modified acids as isostearic acid described in U.S. Patent 2,812,342. Also, alkyl succinic anhydrides such as octyl, dodecyl, isobutyl, and tetrapropenyl succinic anhydrides may be used.

The 4,4-bis(hydroxyaryl)pentanoic acids which may be used are described fully in Alfred R. Bader, U.S. Patent 2,933,520. Operable acids have the structural formula:

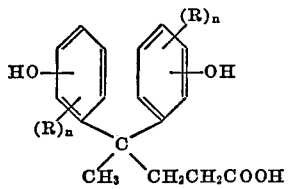

wherein R is a member of the group consisting of chloro, bromo, and lower alkyl. For purposes of this specification, "lower alkyl" embraces alkyl groups of from about 1–7 carbon atoms; $n$ is a number selected from the group consisting of 0, 1, and 2, with the hydroxyl groups being attached to the position of the ring structure when $n$ is 0. These acids are conveniently prepared by reacting levulinic acid with a suitable phenol in the presence of a mineral acid with condensation occurring through the keto group of the levulinic acid. Other methods can be employed. Equivalent acids are those possessing a similar structure obtained by reacting a suitable phenol with an aldehyde-acid in place of the keto acid.

The hydroxyaryl fatty acids which may be used as modifying acids in this invention are hydroxyaryl adducts of unsaturated acids. These acids and their method of preparation are described in U.S. Patent 3,074,983. They are prepared by reacting a phenolic compound selected from groups consisting of phenol and lower alkyl substituted phenols with an unsaturated fatty acid of natural origin at temperatures of about 125–200° C. in the presence of a crystalline clay mineral and from about 0.5 to 2.5% free water.

Any of the unsaturated fatty acids which are found in the naturally occurring oils and fats may be employed in preparing the hydroxyaryl fatty acids. Representative acids are undecylenic, linoleic, linolenic, and erucic acids are well as isomeric modifications of these acids.

The phenolic reactant may be phenol itself, or one of the various derivatives thereof wherein the phenol nucleus is substituted by one or more lower alkyl groups of from 1 to 4 carbon atoms such as methyl, ethyl, propyl, isopropyl, butyl, or isobutyl. For the purposes of this invention the preferred hydroxyaryl fatty acids are prepared from the combination of phenol and its methyl substituted derivatives such as cresol and xylenol to give such end products as phenolated, cresolated, or xylenolated oleic acid. The hydroxyaryl or alkoxyaryl adducts (such as anisole, etc.) of esters of the unsaturated fatty acids such as methyl oleate or ethyl oleate may be used as well as the free acids.

The $C_2$ to $C_6$ acid may be used in amounts of from about 5 to about 20 equivalent percent of the total acid used, but preferably from 10 to 15 equivalent percent and the $C_{12}$ to $C_{22}$ acid, $C_4$ to $C_{20}$ acids, 4,4-bis(hydroxyaryl)pentanoic acid or mixtures thereof may be used in amounts of from about 5 to about 60 equivalent percent, preferably from about 10 to about 40 equivalent percent.

The total monocarboxylic acid chain stopper used should be from about 10 to 60 equivalent percent and preferably about 15 to 45 equivalent percent based upon the total amount of acid used in the formation of the polyamides of this invention. The kinds and amounts of monocarboxylic acids used are dependent largely upon the freeze-thaw, softening point, cold pack, crinkle, and other properties of the end products which are desired, and when mixtures of monocarboxylic acids are used, upon the nature of the other monocarboxylic acids and their combined effect.

The aliphatic, aromatic and heterocyclic diamines used in the present invention include, but are not limited to, the following: ethylene diamine, hexamethylene diamine, propylene diamine, cyclohexane 1,2-diamine, xylenediamine, piperazine, aminoethylpiperazine, and mixtures thereof. As is known in the art, mixed amine systems improve freeze-thaw properties of polyamide resins and consequently even further advantages may be obtained by employing mixed diamines in the polyamides of the present invention.

The novel polyamide resins of the present invention may be prepared using conventional methods in which the diamine and carboxylic acid components are reacted in proportions such that there is substantially one equivalent of amine for each equivalent of acid in the reaction mixture.

The preferred reaction procedure is to heat the acid components in the reaction vessel to about 140 to 180° C. and then slowly add the amine. After addition of the amine, the temperature is gradually increased to about 220 to 240° C. The reaction may be carried out at temperatures within the range of about 200 to 240° C., the higher temperatures being finishing temperatures.

In general the reaction proceeds from about two to twenty hours and preferably about six to eight hours after the desired temperature has been reached. A vacuum may be applied to facilitate the removal of volatile products from the reaction, usually at the end or in the finishing stages. An alternative procedure is to charge all the reactions into the reaction vessel and then apply heat within the ranges indicated above.

There are numerous references in the art describing the specific acid content of "dimer acid." Although, in general, the content of these compositions has not changed, analytical techniques have improved to show discrepancies in the reported contents. Table I shows the composition of "dimer acids" as determined by Molecular Distillation (old method) and Short Path Distillation of Methyl Ester (new method). Both of these methods are described in substantial detail in Technical Bulletin Number 444A, Analytical and Testing Procedures for Emery Organic Chemicals (1967), Emery Industries, Inc., Carew Tower, Cincinnati, Ohio.

propanol-Skellysolve V solution. The resulting solution was then placed in a freezer at about 5° C. for sixteen hours after which a rather solid gel was formed. The gelled solution was removed from the freezer and the time to recover completely to a liquid solution at 25° C. was noted and this is the figure used to indicate the freeze-thaw properties of the polyamide resin. Obviously, the lower the number, the better are the freeze-thaw properties of the resin.

TABLE II.—PROPERTIES OF HIGH TRIMER CONTENT POLYAMIDE RESINS

| | Components (in equivalents) | | | | | | Properties | | | |
|---|---|---|---|---|---|---|---|---|---|---|
| | Weight percent based on trimer and dimer | | Polymeric carboxylic acid of— | | | | | | | |
| Example | Trimer | Dimer | Example 2 | Example 5 | Chain termination tall oil fatty acids | Ethylene diamine | Acid value | Amine value | Soft point 0° C. | Freeze-thaw (minutes) |
| 7 [1] | 15 | 85 | .88 | | .12 | 1.0 | 4.0 | 4.0 | 105–115 | (²) |
| 6 | 22 | 78 | .75 | .10 | .15 | 1.0 | 4.0 | 4.1 | 110 | 110 |
| 8 | 30 | 70 | .61 | .20 | .19 | 1.0 | 6.8 | 2.8 | 110 | 100 |
| 9 | 80 | 20 | | .58 | .42 | 1.0 | 4.5 | 5.5 | 105 | 90 |
| | | | | | Mixed C₃–C₈ monocarboxylic acid | | | | | |
| | | | | | C₃* | C₈** | | | | |
| 10 [1] | 15 | 85 | .78 | | .05 | .17 | 1.0 | 3.2 | 3.0 | 110 | 95 |
| 11 | 24 | 76 | .63 | .10 | .06 | .21 | 1.0 | 6.0 | 5.0 | 109 | 60 |
| 12 | 80 | 20 | | .50 | .11 | .39 | 1.0 | 7.5 | 1.3 | 108 | 55 |

[1] Commercially available polyamide resin Emerez 1530 and 1538 respectively, Emerez trademark of Emery Industries, Inc., is registered.
² Soft gel.
*Straight-chain.
**Branched-chain.

As used in the present specification and claims the monomer, dimer, and trimer acid content of the polymeric carboxylic acid refers to the amount present as determined by the Short Path Distillation of Methyl Ester method.

TABLE I.—ANALYSIS OF POLYMERIC CARBOXYLIC ACIDS
[Content weight percent]

| | | Old method [1] | | | New method [2] | | |
|---|---|---|---|---|---|---|---|
| Example | Trademark | Monomer | Dimer | Trimer | Monomer | Dimer | Trimer |
| 1 | Empol [3] 1016 | Trace | 87 | 13 | 2 | 83 | 15 |
| 2 | Empol 1018 | Trace | 83 | 17 | 5 | 80 | 15 |
| 3 | Empol 1022 | 3 | 75 | 22 | 7 | 77 | 16 |
| 4 | Empol 1024 | Trace | 75 | 25 | 3 | 81 | 16 |
| 5 | Empol 1040 | Trace | 5 | 95 | Trace | 20 | 80 |

[1] Molecular distillation.
[2] Short path distillation of methyl esters.
[3] Registered trademark, Emery Industries, Inc., for "dimer acids" prepared from polymerization of unsaturated fatty acids.

The following examples are provided to further illustrate the invention but are not to be construed in any manner as limiting the scope thereof.

EXAMPLE 6

Preparation of polyamide resin

Into a flask equipped with a thermometer, agitator, and condenser, a charge was added which consisted of: 0.75 equivalent of dimerized fatty acid (Empol 1018), 0.10 equivalent of trimeric fatty acid (Empol 1040), 0.15 equivalent of tall oil fatty acid, and 1.0 equivalent of ethylene diamine.

The temperature was slowly raised to 215° C. with good agitation and water was distilled off the reaction mixture. The temperature was held at 215° C. for three hours at which time a vacuum of 20 torr was applied. After 2½ hours the vacuum was broken with $N_2$ and the resin was removed and allowed to cool.

Examples 7–13 in Table II were prepared substantially in the same manner as Example 6 except the tabulated ingredients were substituted where appropriate. As can be seen from Examples 7–10 and 11–13, increasing trimer content produces polyamide resins with substantially improved freeze-thaw properties, with no adverse effect on softening point.

The freeze-thaw test was conducted by dissolving 20 grams of the polyamide resin in 30 grams of a 50:50 iso- The novel polyamide resins of the present invention may be formulated as in Example 13 to produce flexographic printing ink compositions. In general, however, many additives may be included in printing inks to enhance various properties as known in the are.

EXAMPLE 13

Printing ink composition

A flexographic printing ink is formulated as follows: 25 grams of the polyamide resin of Example 9, 35 grams of titanium dioxide and 40 grams of n-propyl alcohol as a solvent. This ink possesses satisfactory properties including outstanding freeze-thaw characteristics.

In addition, known method of improving freeze-thaw properties, such as employing mixtures of amines or selected monocarboxylic acid chain-stoppers may also be incorporated into the polyamide resins of the present invention to further enhance their excellent properties.

As will be evident to those skilled in the art, various modifications of the present invention can be made or followed in the light of the foregoing disclosure and discussion, without departing from the spirit or scope of the following claims.

We claim:
1. A polyamide resin having improved freeze-thaw characteristics comprising the reaction product of substantially equivalent weights of:
   (a) a diamine selected from the group consisting of aliphatic diamines, cyclic diamines, aromatic diamines, aromatic diamines, piperazine and aminoalkyl piperazines; and

(b) a mixture of carboxylic acids comprising:
  (1) from about 20 to 90 equivalent percent of a polymeric carboxylic acid having an acid functionality of at least about 3;
  (2) from about 10 to 80 equivalent percent of a polymeric carboxylic acid having an acid functionality of about 2; and
  (3) from about 10 to 60 equivalent percent of a chain stopping monocarboxylic acid; wherein the polymeric carboxylic acids of subparagraphs (1) and (2) are present in a ratio of from 1:4 to 9:1 respectively.

2. A polyamide resin as in claim 1 wherein the mixture of carboxylic acids comprises:
  (a) from about 30 to 80 equivalent percent of a trimer acid containing from about 54 to 72 carbon atoms;
  (b) from about 30 to 60 equivalent percent of a dimer acid containing from about 22 to 44 carbon atoms; and
  (c) from about 20 to 50 equivalent percent of a monocarboxylic acid.

3. A polyamide resin as in claim 2 wherein the diamine is selected from the group consisting of ethylene diamine, hexamethylene diamine, propylene diamine, cyclohexane 1,2-diamine, xylene diamine, piperazine, aminoethylpiperazine, and mixtures thereof.

4. A polyamide resin as in claim 3 wherein the monocarboxylic acid is selected from the group consisting of normal aliphatic monocarboxylic acids having from about 2 to 6 carbon atoms, straight chain $C_{12}$ to $C_{22}$ fatty acids, $C_4$ to $C_{20}$ branched acids, 4,4-bis(hydroxyaryl) pentanoic acids, hydroxyaryl $C_{16}$ to $C_{18}$ unsaturated fatty acids, and mixtures thereof.

5. A printing ink composition comprising (a) a pigment; (b) a solvent; and (c) a polyamide resin comprising the reaction product of substantially equivalent weights of:
  (1) a diamine selected from the group consisting of aliphatic diamines, cyclic diamines, aromatic diamines, piperazine and aminoalkyl piperazines; and
  (2) a mixture of carboxylic acids comprising:
    (i) from about 20 to 90 equivalent percent of a polymeric carboxylic acid having an acid functionality of at least about 3;
    (ii) from about 10 to 80 equivalent percent of a polymeric carboxylic acid having an acid functality of about 2; and
    (iii) from about 10 to 60 equivalent percent of a chain stopping monocarboxylic acid; wherein the polymeric carboxylic acids of subparagraphs (i) and (ii) are present in a ratio of from 1:4 to 9:1 respectively.

6. A printing ink composition as in claim 5 wherein the solvent is an alcohol.

7. A printing ink composition as in claim 6 wherein the mixture of carboxylic acids comprises:
  (a) from about 30 to 80 equivalent percent of a trimer acid containing from 54 to 72 carbon atoms;
  (b) from about 30 to 60 equivalent percent of a dimer acid containing from about 22 to 44 carbon atoms; and
  (c) from about 20 to 50 equivalent percent of a monocarboxylic acid.

8. A printing ink composition as in claim 7 wherein the diamine is selected from the group consisting of ethylene diamine, hexamethylene diamine, propylene diamine, cyclohexane 1,2-diamine, xylene diamine, piperazine, aminoethylpiperazine, and mixtures thereof; and the monocarboxylic acid is selected from the group consisting of normal aliphatic monocarboxylic acids having from about 2 to 6 carbon atoms, straight chain $C_{12}$ to $C_{22}$ fatty acids, $C_4$ to $C_{20}$ branched acids, 4,4-bis(hydroxyaryl) pentanoic acids, hydroxyaryl $C_{16}$ to $C_{18}$ unsaturated fatty acids, and mixtures thereof.

References Cited
UNITED STATES PATENTS

| | | | |
|---|---|---|---|
| 3,412,115 | 11/1968 | Floyd et al. | 260—404.5 |
| 3,383,391 | 5/1968 | Carlick et al. | 260—18 N X |
| 3,377,303 | 4/1968 | Peerman et al. | 260—18 N |
| 3,269,999 | 8/1966 | Moore et al. | 260—18 N X |
| 3,253,940 | 5/1966 | Floyd et al. | 106—316 |

THEODORE MORRIS, Primary Examiner

U.S. Cl. X.R.

260—18 N